March 3, 1942.  A. E. NEWTON  2,274,930
IMMERSION HEATER FOR ELECTRICALLY HEATED DOMESTIC
UTENSILS AND OTHER APPLIANCES
Filed July 1, 1938  4 Sheets-Sheet 1
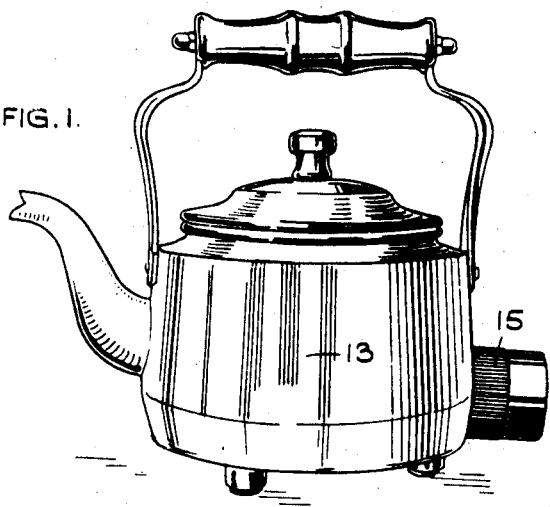
FIG.1.
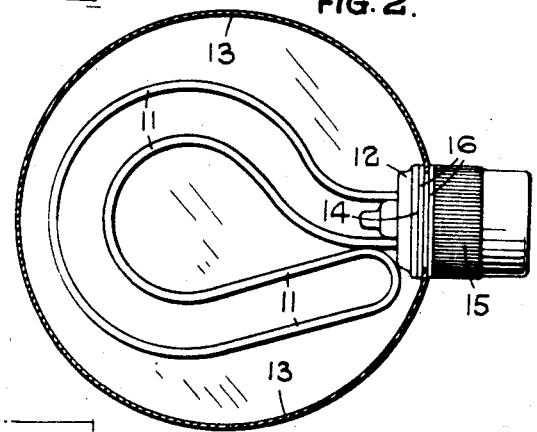
FIG.2.
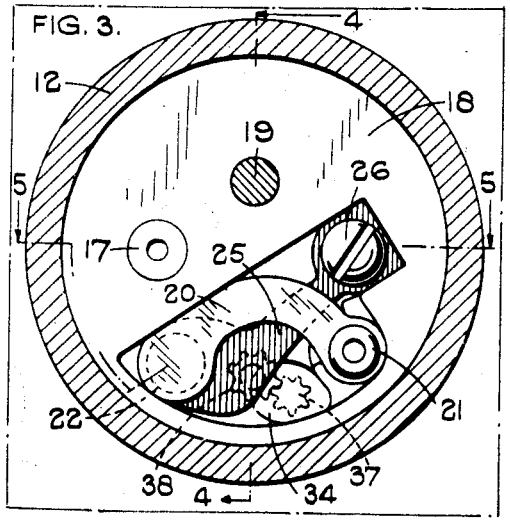
FIG.3.
Inventor
ALBERT EDWARD NEWTON
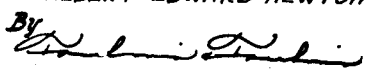
Attorneys

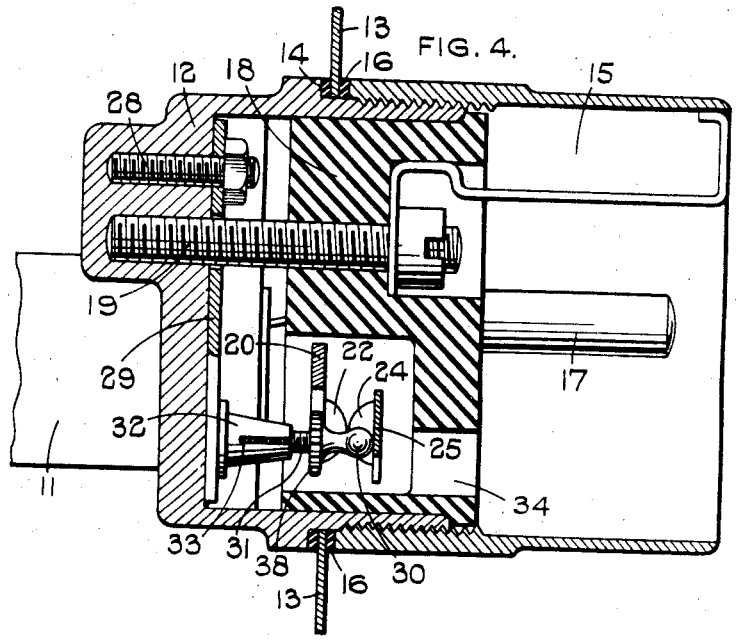
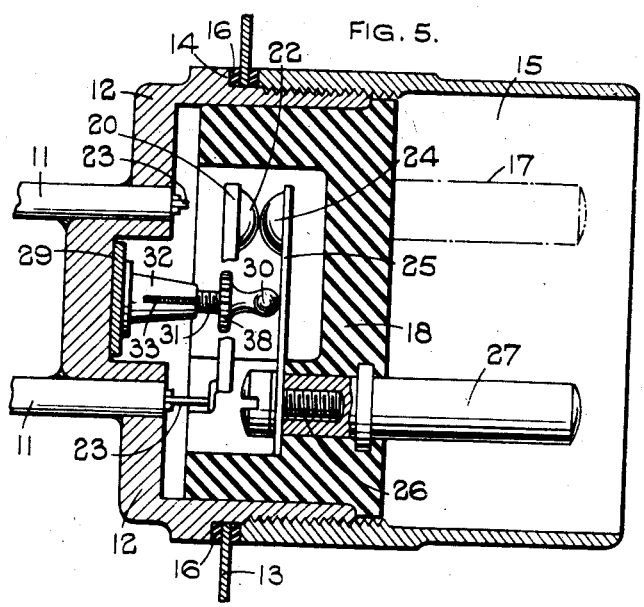

March 3, 1942.   A. E. NEWTON   2,274,930
IMMERSION HEATER FOR ELECTRICALLY HEATED DOMESTIC
UTENSILS AND OTHER APPLIANCES
Filed July 1, 1938   4 Sheets-Sheet 3
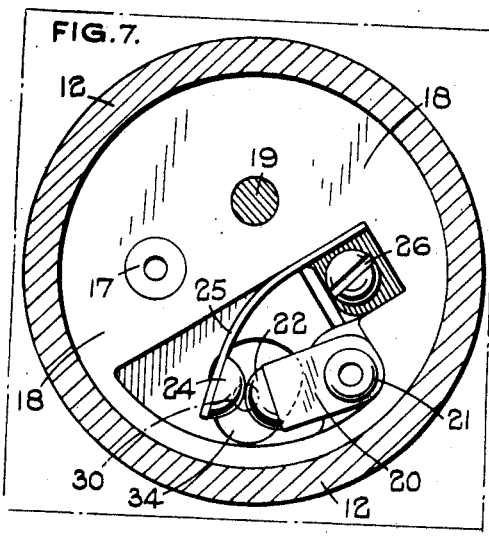
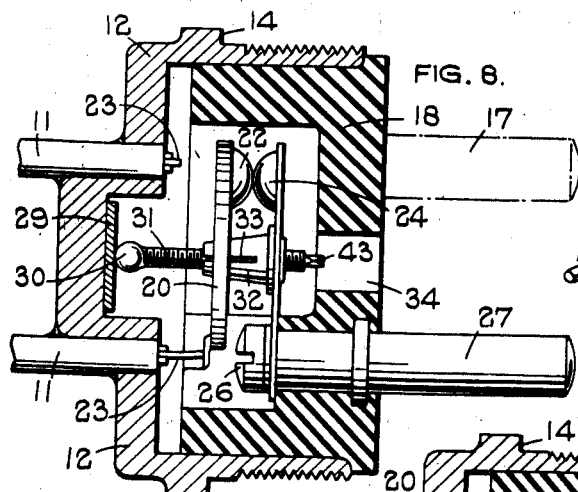
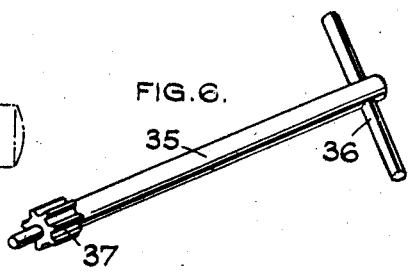
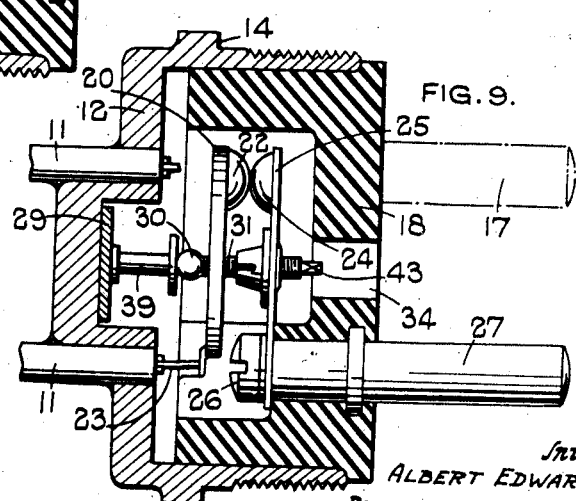
Inventor
ALBERT EDWARD NEWTON
By
Attorneys March 3, 1942.  A. E. NEWTON  2,274,930
IMMERSION HEATER FOR ELECTRICALLY HEATED DOMESTIC
UTENSILS AND OTHER APPLIANCES
Filed July 1, 1938  4 Sheets-Sheet 4

Inventor
ALBERT EDWARD NEWTON
By
Attorneys

Patented Mar. 3, 1942

2,274,930

UNITED STATES PATENT OFFICE 2,274,930

IMMERSION HEATER FOR ELECTRICALLY HEATED DOMESTIC UTENSILS AND OTHER APPLIANCES

Albert Edward Newton, Birmingham, England, assignor to Premier Electric Heaters, Limited, Birmingham, England Application July 1, 1938, Serial No. 217,011
In Great Britain July 1, 1937

7 Claims. (Cl. 219—44)

This invention relates to immersion heaters for electrically heated domestic utensils and other appliances.

With such heaters, as hitherto constructed, it is possible for the heater to be left switched on unintentionally until all or nearly all of the liquid within the kettle or other utensil has evaporated, with the result that ultimately the structure of the kettle itself is damaged by the heat.

One object of the present invention is to provide an improved safety device for an immersion heater which will obviate all risk of such an accident.

Another object of the invention is to provide an immersion heater having an automatic cut-out device which is of robust construction and certain in its action. A further object is to provide reliable self-setting means for the cut-out device, so that the latter requires no attention whatever on the part of the user.

Referring to the drawings:

Figure 1 is a view of a domestic kettle embodying an immersion heater according to this invention.

Figure 2 is a sectional plan view of Figure 1,

Figure 3 is a transverse section, to an enlarged scale, of the external portion of the heater assembly and shows the application thereto of one form of automatic cut-out in accordance with the present invention, Figures 4 and 5 are sections on the lines 4—4 and 5—5, respectively, of Figure 3, Figure 6 is a perspective view of a tool for use in adjusting the setting of the device, Figure 7 is a view corresponding to Figure 3 and illustrating a modified construction.

Figures 8 and 9 are views corresponding to Figure 5, and illustrate further modifications.

Figure 10:
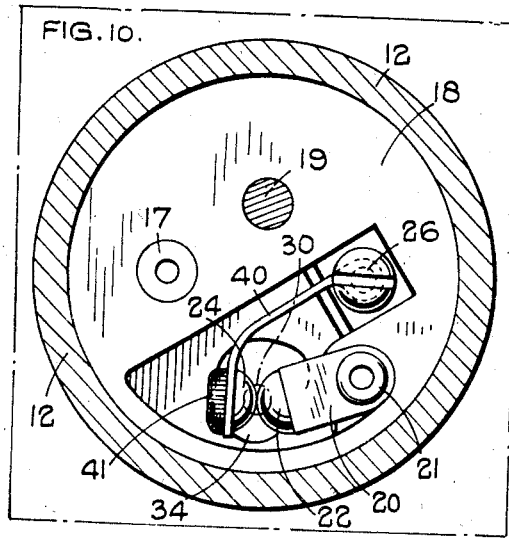
Figure 11:
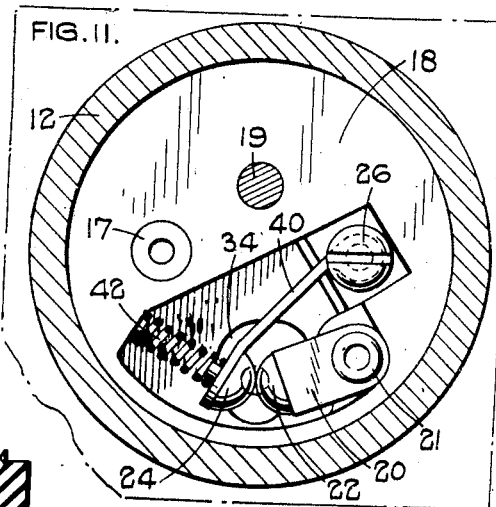

Figures 10 and 11 are views corresponding to Figure 3, and illustrate further modifications.

Figure 12:
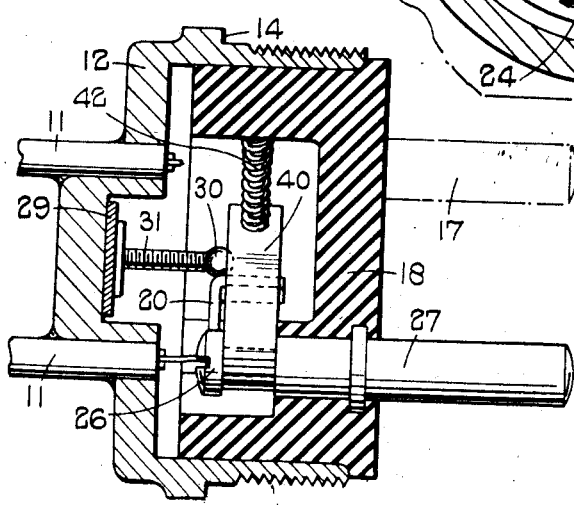

Figure 12 is a view corresponding to Figure 5, but showing the construction illustrated in Figure 11.

In the construction illustrated in Figures 1 to 5, the heating element comprises a resistance winding enclosed within a tubular metal casing 11 which may be bent into loop form or other suitable shape, the ends of such casing 11 being mounted in a hollow plug 12 which is adapted to be secured in a wall 13 of a kettle or other vessel. When the casing 11 is bent into loop form, such look may be doubled upon itself and the central portion of the casing may be secured directly to the plug 12, so that the latter receives heat by transmission from the hottest part of the element.

The plug 12 is formed with a shoulder 14 which abuts the inner face of the vessel wall 13 and the body of the plug may be screw-threaded externally to receive a nut 15 of sleeve form which engages the outside of the vessel, rubber or other washers 16 being interposed between the shoulder 14 and nut 15 and the wall 13 to ensure a liquid-tight joint.

One end of the resistance winding is connected to a terminal pin 17 carried by a hollow insulating block 18 which is secured in the outer end of the plug 12 by a bolt 19, whilst the other end of the winding is connected to a rigid conducting strip or member 20 which has one end fixedly secured at 21 within the block 18 and carries a contact 22 at its free end. Both such connections may be either direct or through the medium of lead-in wires 23.

The contact 22 co-operates with a similar contact 24 carried by the free end of a resilient metal blade 25, the pressure of which normally holds the contact 24 in engagement with the contact 22, this blade 25 being secured by means of a screw 26 to the inner end of a second terminal pin 27 mounted in the block 18.

The block 18 with the pins 17, 27 thereon constitutes the plug portion of a plug-and-socket connector, the socket portion of which is associated with a length of flex through which current may be conveyed to the heating element.

Extending transversely of the hollow plug 12 and secured to the interior thereof by a screw 28, is a bi-metallic strip 29 which constitutes the thermostatic element and may extend downwards from the screw 28, this latter preferably being so arranged as to be uncovered before the heating element when the level of liquid in the vessel fails. The free end of the bi-metallic strip 29 carries an insulating head 30, which may be conveniently be formed of glass.

In the event of the heating element reaching a predetermined temperature, the heat of such element is transmitted to the bi-metallic strip 29 through the metal of the plug 12, whereupon the strip 29 bends outwardly so that the head 30 on the screw 31 carried thereby engages the spring blade 25, the contact 24 on the latter being thus pushed away from the fixed contact 22, so that the circuit through the heating element is broken.

As the heating element cools down, the bi-metallic strip 29 returns to its original position and the spring blade 25 automatically re-sets the contact 24 thereon in engagement with the other contact 22, so that current is again supplied to the heating element.

It will be understood that the contacts 22, 24 are not separated until the bi-metallic strip 29 has moved sufficiently to bring the head 30 thereon into engagement with the spring blade 25, and means may be provided for regulating the amount of such movement. This adjustment also serves to compensate for inaccuracies in the manufacture of the parts.

In a convenient arrangement, the glass or other insulating head 30, which may be of spherical form, is provided at the end of a screw 31 which engages a threaded socket 32 on the strip 29, this socket being preferably split longitudinally as at 33.

The requisite adjustment is effected by rotating the screw 31 so as to move it into or out of the socket 32, so that a greater or smaller deformation of the strip 29 is required to bring the head 30 against the contact blade 25.

This adjustment may be effected from the exterior of the device by inserting, through the hole 34 in the block 18, the shank 35 of the tool shown in Figure 6. This tool is provided at its outer end with a tommy bar 36 or the equivalent for turning it, and at its inner end with a pinion 37 which, when the tool is fully inserted, meshes with a second pinion 38 formed or provided on the screw 31. It is not, however, desirable that such adjustment be readily effectable by the user of the device or any other unskilled person.

Figure 7 illustrates a modified construction of automatic cut-out in which the movement of the spring-pressed contact 24 takes place in a plane transverse to the axis of the plug 12, instead of in a plane parallel to such axis as in Figures 1 to 5.

The insulating head 30 engages simultaneously with the contacts 24 and tends to move between them, this arrangement being advantageous in certain circumstances because the amount of movement of the head 30 necessary to separate the contacts is less than that required with the preceding construction. Furthermore, the operation of the cut-out is not affected by wear of the contacts 22, 24 and a stiffer spring blade 25 may be used.

Figure 8 shows another alternative construction in which the insulating head 30 is mounted on the contact blade 25 and engages the bi-metallic strip 29, which is the converse of the arrangement shown in Figures 1 to 5.

A slightly different arrangement is illustrated in Figure 9, the bi-metallic strip 29 in this case being provided with a projecting stem 39 which engages the head 30 carried by the contact blade 25.

Figure 10 shows a cut-out device which operates in a similar manner to the arrangement of Figure 7, the moving contact 24, however, being mounted on a strip 40 which may be rigid and is hingedly mounted on the screw 26 which secures it to the terminal pin 27. The hinged strip 40 carries a weight 41 whereby the contact 24 thereon is biassed towards the fixed contact 22.

The modification shown in Figures 11 and 12, resembles the construction last described, inasmuch as the moving contact 24 is carried by a hinged arm, but in this case the strip 40 is acted upon by a compression spring 42 instead of being weighted.

In the constructions shown in Figures 7 to 12, the insulating head 30 may be adjustable as in Figures 1 to 5, and instead of rotating the screw 31 by a gear drive from the adjusting tool, the screw 31 may project through the socket 32 and the tool may be adapted for engagement with a non-circular portion 43 at the free end of the screw.

The glass or insulating head 30 may be replaced by a metallic member which is suitably insulated from the part on which it is mounted.

A retaining member may be provided which is adapted to move automatically into a position to retain the movable contact 24 in the open position after the cut-out has operated, and this retaining member may be releasable by hand so as to re-close the switch and permit the utensil or appliance to be used in the ordinary way after the cut-out has operated.

The retaining member may consist of a pivoted or otherwise movable plate, which is adapted to drop down by gravity between the contacts 22, 24 after they have been separated so as to retain the switch in the open position.

Alternatively, the retaining member may consist of a spring catch having a ratchet tooth past which one end or edge of the contact blade 25 can ride so that it becomes caught by the ratchet tooth when in the open position.

In another arrangement, a shouldered plate may be pivoted or suspended above the contact strips 20, 25 so that a narrow portion thereof hangs down between them. When the switch is opened, a wider portion of this plate drops down and engages between the two strips 20, 25 so as to hold the contacts 22, 24 apart.

In all of these arrangements, the retaining member, after having come into operation, may be released by hand.

If desired, the switch may itself be mounted on a bi-metallic strip, and a second bi-metallic strip may be used carrying the switch-operating head 30 or equivalent member, the two bi-metallic strips being arranged so that when heated they bend towards one another. With this arrangement a quicker opening or separation of the contacts is obtained.

In the case of Figures 1 to 5, 8 and 9, the contact strip 20 may be recessed or shaped to clear the switch-operating member, or alternatively the latter may pass through a clearance hole in the strip 20. It should be understood that this strip, although hereinbefore referred to as rigid, may equally well be formed as a spring blade.

In all the constructions above described, it will be observed that any springs provided are disposed remote from the heating element so that all risk of such springs becoming de-tempered by excessive heat is avoided. The construction shown in Figure 10, however, contains no spring of any kind.

An immersion heater incorporating a cut-out device constructed as aforesaid is intended for operation on alternating current, and when direct current only is available, it is necessary to connect a condenser in parallel with the contacts or to take other suitable steps to prevent "arcing" when the switch opens.

Whilst I have illustrated and described certain specific forms of construction for carrying my invention into effect, these are capable of variation and modification without departing from the spirit of the invention.

I, therefore, do not wish to be limited to the precise details of construction hereinbefore set forth, but desire to avail myself of such variations and modifications as come within the scope of the annexed claims.

What I claim then is:

1. In a vessel for heating liquids, an electric heater comprising a mounting, a heating element thermally connected to said mounting and adapted to be immersed within the liquid, a switch adapted to control the supply of current to said element, a heat transmitting portion of said mounting disposed at a level higher than that of the highest part of said heating element, a bi-metallic strip mounted in direct contact with said heat transmitting portion, said bi-metallic strip being adapted, when heated to a predetermined temperature, to deform and operate said switch to reduce the current supplied to said element, and said heat transmitting portion having a high thermal conductivity and being adapted to be uncovered by said liquid before uncovering of said element, so that immediately the temperature of said element rises above its operating value, said heat transmitting portion will transmit the heat directly to said bimetallic strip and cause the latter to operate said switch.

2. In a vessel for heating liquids, an electric heater comprising a mounting, a heating element thermally connected to said mounting and adapted to be immersed within the liquid, a heat transmitting portion of said mounting disposed at a level higher than that of the highest part of said heating element, a pair of separable contacts in circuit with said heating element, a bi-metallic strip mounted in direct contact with said heat transmitting portion and adapted to deform on heating, means for transmitting the deforming movement of said strip directly to at least one of said contacts to separate the same, and said heat transmitting portion having a high thermal conductivity and being adapted to be uncovered by said liquid before uncovering of said element so that immediately the temperature of said element rises above its operating value, said heat transmitting portion will transmit the heat directly to said bi-metallic strip and cause the latter to separate said contacts.

3. In a vessel for heating liquids, an electric heater comprising a mounting, a heating element thermally connected to said mounting and adapted to be immersed within the liquid, a heat transmitting portion of said mounting disposed at a level higher than that of the highest part of said heating element, a pair of separable contacts in circuit with said heating element, a bi-metallic strip, means fixing one end of said strip in direct contact with said heat transmitting portion, the free end of said strip being adapted to deform on heating, means for transmitting the deforming movement of said strip directly to at least one of said contacts to separate the same, and said heat transmitting portion having a high thermal conductivity and being adapted to be uncovered by said liquid before uncovering of said element so that immediately the temperature of said element rises above its operating value, said heat transmitting portion will transmit the heat directly to said bi-metallic strip and cause the latter to separate said contacts.

4. In a vessel for heating liquids, an electric heater comprising a hollow mounting plug, a heating element thermally connected to said hollow plug and adapted to be immersed within the liquid, a heat transmitting portion of said hollow plug disposed at a level higher than that of the highest part of said heating element, a pair of contacts in circuit with said heating element, one of said contacts being movable away from the other to open said circuit, spring means for urging said movable contact into engagement with the other contact, a bi-metallic strip housed in said hollow plug, means fixing one end of said strip in direct contact with said heat transmitting portion, the free end of said strip being adapted to deform on heating, means for transmitting the deforming movement of said bi-metallic strip directly to said movable contact in opposition to said spring means, and said heat transmitting portion having a high thermal conductivity and being adapted to be uncovered by said liquid before uncovering of said element so that immediately the temperature of said element rises above its operating value, said heat transmitting portion will transmit the heat directly to said bi-metallic strip and cause the latter to separate said contacts.

5. In a vessel for heating liquids, an electric heater comprising a hollow mounting plug, a heating element thermally connected to said hollow plug and adapted to be immersed within the liquid, a heat transmitting portion of said hollow plug disposed at a level higher than that of the highest part of said heating element, a pair of contacts in circuit with said heating element, a spring plate housed in said hollow plug, said spring plate carrying one of said contacts and normally pressing it against the other contact, a bi-metallic strip housed in said hollow plug, means fixing one end of said strip in direct contact with said heat transmitting portion, the free end of said strip being adapted to deform on heating, an operating member projecting from said strip and having a screw-threaded connection thereto so that by rotation of said member the extent of its projection can be adjusted, said member transmitting the deforming movement of said strip directly to said spring plate in a manner to separate said contacts, and said heat transmitting portion having a high thermal conductivity and being adapted to be uncovered by said liquid before uncovering of said element so that immediately the temperature of said element rises above its operating value, said heat transmitting portion will transmit the heat directly to said bi-metallic strip and cause the latter to separate said contacts.

6. In a vessel for heating liquids, an electric heater comprising a hollow mounting plug, a heating element thermally connected to said hollow plug and adapted to be immersed within the liquid, an integral thickened boss on said hollow plug at a level higher than that of the highest part of said heating element and forming a heat transmitting portion, a pair of contacts in circuit with said heating element, a spring plate housed in said hollow plug, said spring plate carrying one of said contacts and normally pressing it against the other contact, a bi-metallic strip housed in said hollow plug, means fixing one end of said strip in direct contact with the face of said thickened boss within said hollow plug, the free end of said strip being adapted to deform on heating, an operating member projecting from said strip and having a screw-threaded connection thereto so that by rotation of said member the extent of its projection can be adjusted, said member transmitting the deforming movement of said strip directly to said spring plate in a manner to separate said contacts, gear teeth provided on said operating member and adapted for engagement by a suitable rotary tool for purposes of adjustment, and said heat transmitting portion having a high thermal conductivity and being adapted to be uncovered by said liquid before uncovering of said element so that immediately the temperature of said element rises above its operating value, said heat transmitting portion will transmit the heat directly to said bi-metallic strip and cause the latter to separate said contacts.

7. In a vessel for heating liquids, an electric heater comprising a hollow mounting plug, a heating element thermally connected to said hollow plug and adapted to be immersed within the liquid, an integral thickened boss on said hollow plug at a level higher than that of the highest part of said heating element and forming a heat transmitting portion, an insulating block secured in the outer end of said plug, a pair of contacts in circuit with said heating element, a spring plate fixed at one end to said insulating block and housed in said hollow plug, said spring plate carrying at its free end one of said contacts and normally pressing said contact against the other contact, a bi-metallic strip housed in said hollow plug, means fixing one end of said strip in direct contact with the face of said thickened boss within said hollow plug, the free end of said strip being adapted to deform on heating, an operating member projecting from said spring plate and having a screw-threaded connection thereto so that by rotation of said member the extent of its projection can be adjusted, said member being adapted for engagement by said bi-metallic strip so as to transmit the deforming movement thereof directly to said spring plate in a manner to separate said contacts, and said heat transmitting portion having a high thermal conductivity and being adapted to be uncovered by said liquid before uncovering of said element so that immediately the temperature of said element rises above its operating value, said heat transmitting portion will transmit the heat directly to said bi-metallic strip and cause the latter to separate said contacts.

ALBERT EDWARD NEWTON.